(12) United States Patent
Brandt et al.

(10) Patent No.: US 7,605,774 B1
(45) Date of Patent: Oct. 20, 2009

(54) ENHANCED VISION SYSTEM (EVS) PROCESSING WINDOW TIED TO FLIGHT PATH

(75) Inventors: Lawrence C. Brandt, West Linn, OR (US); Robert B. Wood, Beaverton, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 570 days.

(21) Appl. No.: 10/884,073

(22) Filed: Jul. 2, 2004

(51) Int. Cl.
*G09G 5/00* (2006.01)
(52) U.S. Cl. ................................ 345/7; 701/3; 340/972
(58) Field of Classification Search ................ 345/7–9; 359/630; 701/3–18, 210; 340/972
See application file for complete search history.

(56) References Cited

U.S. PATENT DOCUMENTS

| | | | | |
|---|---|---|---|---|
| 3,686,626 | A * | 8/1972 | Bateman et al. | 340/980 |
| 4,368,517 | A * | 1/1983 | Lovering | 701/16 |
| 4,926,346 | A * | 5/1990 | Yokoyama | 701/28 |
| 5,745,054 | A * | 4/1998 | Wilkens | 340/972 |
| 6,018,698 | A * | 1/2000 | Nicosia et al. | 701/214 |
| 6,107,943 | A * | 8/2000 | Schroeder | 340/945 |
| 6,405,107 | B1 * | 6/2002 | Derman | 701/3 |
| 6,806,469 | B2 * | 10/2004 | Kerr | 250/330 |

OTHER PUBLICATIONS

CMC Electronics' Suresight™ Enhanced Vision System Files Hign on New Boeing Technology Demonstrator Airplane, Jun. 29, 2004, 2 pages, cmc electronics.
CMS Electronics delivers SureSight EVS sensor for Global Express, Defence Systems Daily, Paris Air Show News, Jun. 19, 2003, 2 pages.
Overview, Commercial Aviation Enhanced Vision Systems, Jun. 29, 2004, 4 pages, cmc electronics.
Sweetman, Bill, Fog Thick on EVS, ShowNews online, © 2002, AviationNow.com, 2 pages.

\* cited by examiner

*Primary Examiner*—Alexander Eisen
*Assistant Examiner*—Jason M Mandeville
(74) *Attorney, Agent, or Firm*—Daniel M. Barbieri

(57) ABSTRACT

A head-up display (HUD) system for an aircraft is disclosed. The HUD comprises a computer receiving information representative of an aircraft flight path. The HUD also comprises a head-up display unit comprising a projector and a combiner. The combiner receives an image from the projector. An imaging sensor is coupled to the computer. The imaging sensor has a pointing direction and a field of view. A region of special processing is defined within the imaging sensor field of view. A program is running on the computer. The program determines an offset for the region of special processing. The offset is based on the aircraft flight path and the imaging sensor pointing direction. The offset is used in the computer to cause display region of special processing to be moved based on the direction of the aircraft flight path.

25 Claims, 2 Drawing Sheets

FIG. 1

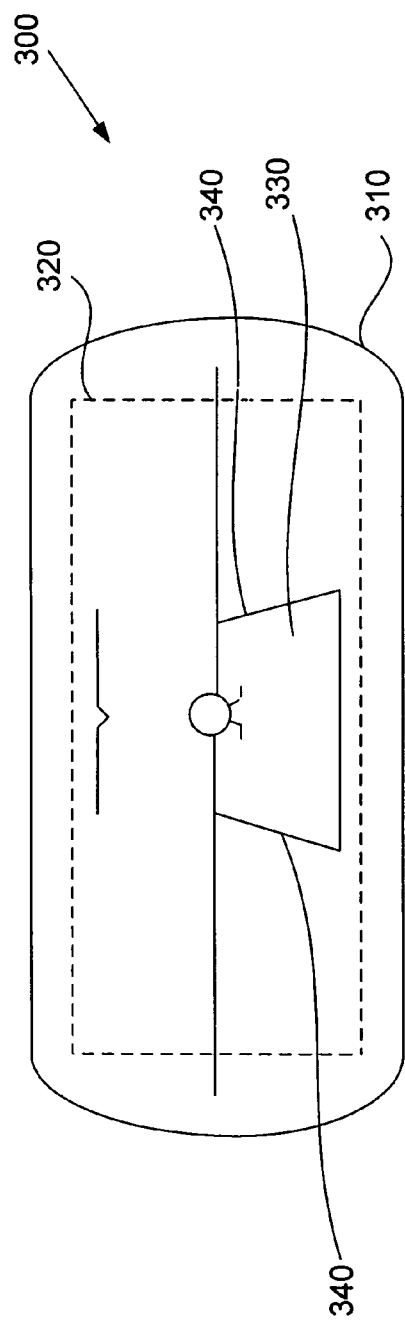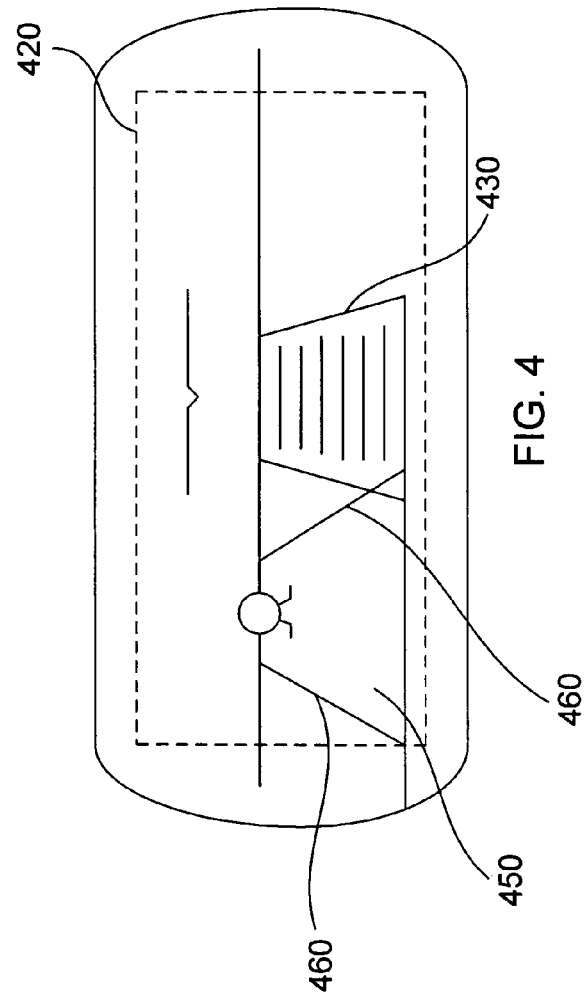

ENHANCED VISION SYSTEM (EVS) PROCESSING WINDOW TIED TO FLIGHT PATH

BACKGROUND

Many aircraft have been equipped with head-up displays (HUDs) for providing information to flight crews. Such head-up displays are advantageous in that they allow the flight crew to maintain eye contact with the outside environment while simultaneously viewing information from aircraft systems and sensors in a graphical and alphanumeric format overlaying the outside world view. Head-up display systems are known to provide conformal information such that displayed features overlay the environmental view. Head-down display systems are known to provide substantially equivalent information in a nonconformal manner. Further, head-up display systems are known to display information from an infrared imaging sensor mounted on the aircraft to be conformally mapped onto the environmental view. Further still, both head-up and head-down display systems are known to display information from a camera or other imaging sensor (such as a visible light imaging sensor, infrared imaging sensor, millimeter wave radar imager, etc.), mounted on the aircraft. As is known in the art, an area of special processing around the center region of the imaging sensor or imaging sensor field of view is used to enhance the view of certain features such as but not limited to the runway environment. However, problems with such sensor systems often occur in environments of substantial cross winds in which the sensor is aligned to the aircraft axis and is not necessarily aligned with the velocity vector of the aircraft. Accordingly, there is need for a system and method which may provide such corrections so that the area of special processing of the sensor image may be properly aligned with the velocity vector on the head-up display and/or head-down display.

For example, head-up display systems are known to display an enhanced vision imaging sensor video view that may be manipulated through an area, or "window", of special processing that can tailor gains and perform other manipulative techniques to optimize portions of an infrared (IR) view of the outside scene that are of special interest to the pilot. In a particular implementation, an enhanced vision system imaging sensor may have a trapezoidal area which may optimize the IR view of the landing lights on approach, e.g., while maintaining normal video processing of the mid range infrared view of the surrounding terrain. The problem is that this area of special processing is fixed within the imaging sensor's field of view. On actual approaches to the runway, cross winds may cause the aircraft to be pointed in a direction other than that in which it is moving, thereby causing the aircraft mounted sensor to be misaligned with the desired environment, e.g. the runway. Accordingly, the area of special processing will be misaligned with the actual region of interest (e.g. the runway).

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

What is provided is a head-up display (HUD) system for an aircraft. The HUD system comprises a computer receiving information representative of an aircraft flight path. The HUD system also comprises a head-up display unit comprising a projector and a combiner. The combiner receives an image from the projector. The HUD system also comprises an imaging sensor coupled to the computer. The imaging sensor has a pointing direction and a field of view. A region of special processing is defined within the field of view. Further, the HUD system comprises a program running on the computer. The program determines an offset for the region of special processing. The offset is based on the aircraft flight path and the imaging sensor pointing direction. The offset is used in the computer to cause display of the region of special processing to be moved based on the direction of the aircraft flight path.

What is also provided is method of providing a conformal imaging sensor image on a head-up display system for an aircraft. The method comprises receiving by a computer, aircraft sensor information comprising information representative of the flight path of the aircraft. The method also comprises receiving by the computer, imaging sensor image information from an aircraft mounted imaging sensor. The imaging sensor has a pointing direction and a field of view. The computer defines a region of special processing within the field of view. Further, the method comprises generating an offset for the region of special processing by a program running on the computer. The offset is based on the flight path of the aircraft and the imaging sensor pointing direction. Further still, the method comprises using the offset by the computer, to cause the region of special processing to be moved within the field of view.

Further, what is provided is a head-up display system for an aircraft. The HUD system comprises a means for receiving aircraft sensor information comprising information representative of the flight path of the aircraft. The HUD system also comprises a means for receiving imaging sensor image information from an aircraft mounted imaging sensor. The imaging sensor has a pointing direction and a field of view. The computer defines a region of special processing within the imaging sensor field of view. Further, the HUD system comprises a means for generating an offset for the region of special processing by a program running in a computer. The offset is based on the flight path of the aircraft and the imaging sensor pointing direction. Further still, the HUD system comprises a means for using the offset to cause the region of special processing to be moved within the field of view.

Alternative examples and other exemplary embodiments may also be provided which relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which:

FIG. 3 is an exemplary diagram display (head-up or head-down) having an area of special processing and the region of interest are aligned; and FIG. 4 is an exemplary diagram of a display (head-up or head-down) illustrating a misalignment of the area of special processing and the region of interest.

DETAILED DESCRIPTION OF PREFERRED AND EXEMPLARY EMBODIMENTS

Figure 1:
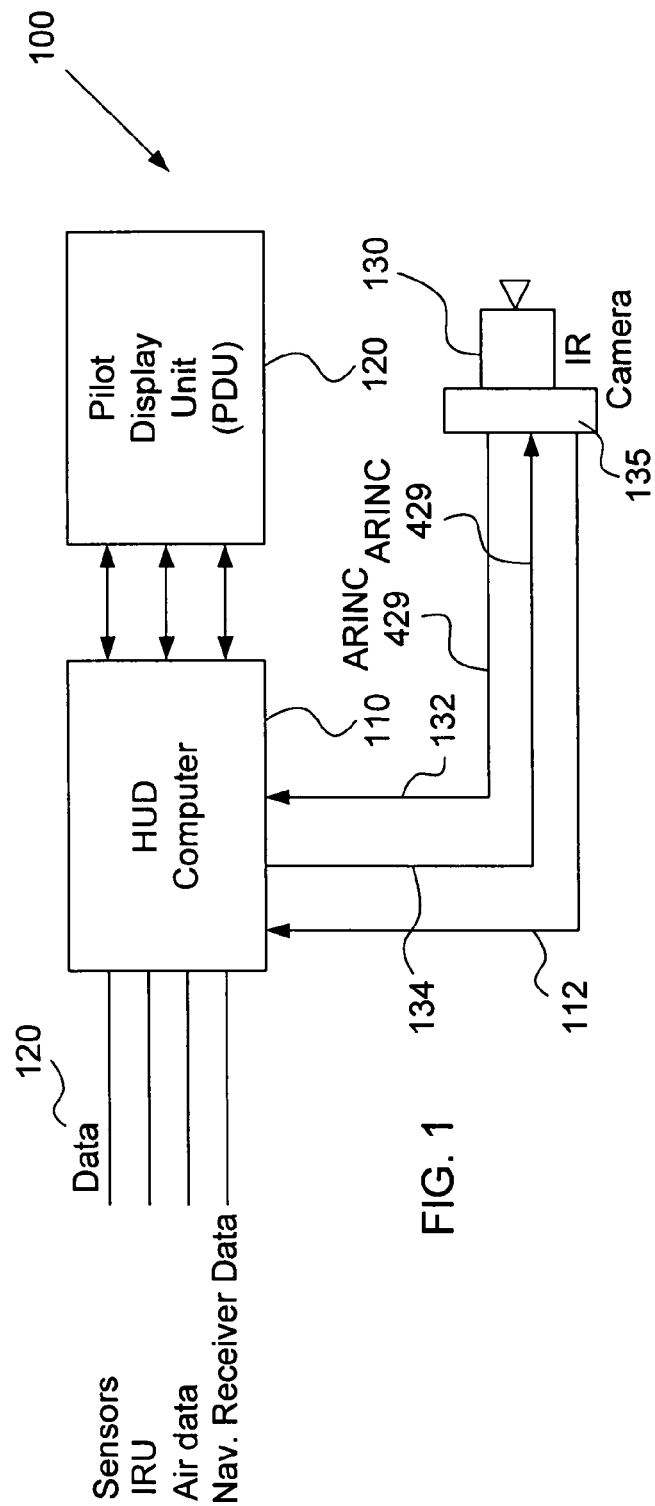
FIG. 1 is an exemplary blocked diagram of a HUD system for an aircraft.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring to FIG. 1, an on-board head-up display system 100 is depicted. System 100 comprises a HUD computer 110 which receives data 120 from a plurality of sources including, but not limited to sensors, inertial reference units, air data, navigation receiver data, etc. HUD computer 110 utilizes the information in providing information to a head-up display or a pilot display unit 120, which may include a projector, tuned optics, and a combiner for providing an image to a user. HUD computer 110 may also be coupled to an infrared imaging sensor 130 that is mounted in a fixed position and orientation on an aircraft. Infrared imaging sensor 135 (which may alternatively be a camera, millimeter wave radar operating in the 94 GHz or 35 GHz spectrums, or other imaging sensor) may include a sensor computer 135 for providing a special processing region within the imaging sensor field of view. Alternatively, the special processing may be carried out on HUD computer 110 or other processing devices. Infrared imaging sensor 130 provides an infrared image to HUD computer 110 via video interface 112. Further, infrared imaging sensor 130 is provided with communication to HUD computer 110 through a communications bus 132 which may be an ARINC 429 bus, but is not limited to ARINC 429 communications, for the purpose of providing status information to HUD computer 110. Similarly, HUD computer 110 communicates over a bus 134 (which may be an ARINC 429 bus) to IR computer 135 for the purpose of providing command information to imaging sensor 130.

Referring to FIG. 3, a head-up display 300 is depicted. Head-up display 300 shows a combiner 310 having an IR imaging sensor field of view 320 conformally mapped to the outside environment. This situation occurs when there is little to no crosswind and the imaging sensor direction is substantially aligned to the axis of the aircraft. Infrared imaging sensor 130 provides an enhanced image of a runway 330. The enhanced runway image 330 is conformally mapped to the outside environment such that boundaries 340 of runway 330 are pronounced and may be clearly seen by a pilot even in conditions of low visibility. This enhanced runway image 330 is provided through a special processing region around the middle of the imaging sensor field of view 320.

Figure 2:
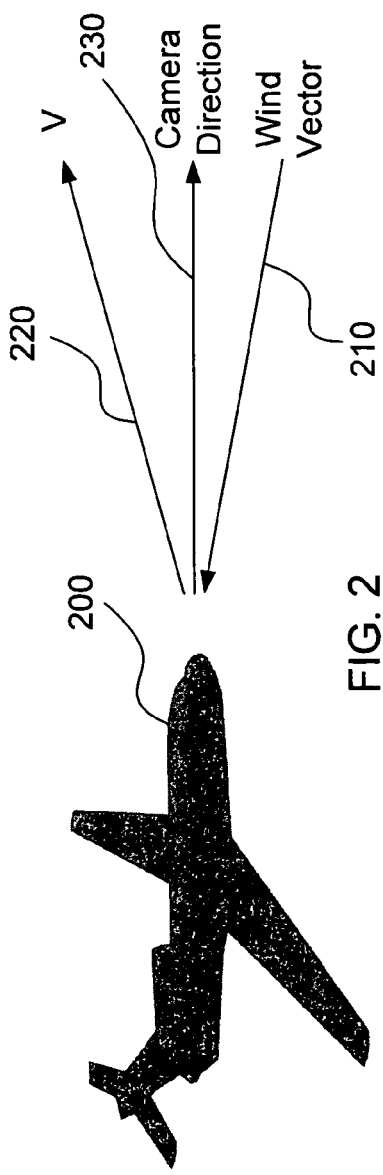
FIG. 2 is an exemplary diagram depicting the imaging sensor direction and velocity vector of an aircraft in the presence of a cross wind.

Referring now to FIG. 2, the situation in which an aircraft 200 encounters a strong crosswind creates a wind vector 210 in the direction shown. In this situation, the aircraft velocity may be in the direction 220 (this situation is often referred to as the aircraft crabbing through the air space). The velocity vector then is not aligned with the IR imaging sensor pointing direction 230 as depicted, since the imaging sensor is at a fixed orientation on the aircraft (i.e. the imaging sensor is aligned with the aircrafts longitudinal axis). Accordingly, the IR imaging sensor field of view will provide a region of special processing 430 within the IR imaging sensor field of view 420 as depicted in FIG. 4. The difficulty is that because the imaging sensor is fixed, the velocity vector is not aligned with the imaging sensor direction. The region of special processing 430 which enhances the runway and runway boundaries does not line up with the actual runway 450 and runway boundaries 460, but is misaligned with the actual runway 450 having boundaries 460. The special processing region designed to enhance runway 450 is placed in the wrong position. Accordingly, what is required is that an offset for the special processing region be provided and the special processing region is moved such that the area of special processing 430 is aligned with runway 450.

In order to accomplish the offset, the imaging sensor (imaging sensor computer 135 or HUD computer 110) reads an offset between the imaging sensor angle and the actual velocity vector. This offset, based on the angle between the two vectors, provides the required information to properly map the region of special processing to the velocity vector direction. This offset may be computed by the HUD computer 110 or other processing devices such as but not limited to the imaging sensor computer 135. Accordingly, the special processing window of the infrared imaging sensor is tied to the flight path by using available information from an on-board inertial reference system, or from a GPS-aided IRS. This may be particularly appropriate when the infrared imaging sensor view is displayed on a HUD, which displays conformal flight path information. This use of an enhanced vision or infrared imaging sensor is that an area of special processing, like an area of changing gain or other video processing in an area of the approach runway, would be aligned with actual flight path of the airplane on approach, and so would properly overlay the runway route, regardless of the crosswind.

Alternatively it should be noted that, display 300 and 400 may be a head-down display in which the imaging sensor view, and area of special processing are used in a similar manner as the head-up display, but there is no conformal mapping to the outside environment.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A head-up display (HUD) system for an aircraft, the head-up display system for generating display images for display via a display unit configured to display an enhanced view, the head-up display system comprising:

a first input coupled to an imaging sensor, the imaging sensor having a pointing direction and a field of view;

a computer coupled to the first input and receiving information from the first input relating to the field of view, the computer configured to conduct a processing activity on a first region of the information to generate the display images, wherein the first region is a subset of the information from the first input relating to the field of view and wherein a second region is defined by a remainder of the information from the first input relating to the field of view;

a second input for receiving a signal from a source, the signal relating to an actual velocity vector of the aircraft;

a program running on the computer, the program determining the actual velocity vector of the aircraft based on the signal received at the second input, the program further determining an offset for the first region, the offset based on the determined actual velocity vector and the imaging sensor pointing direction, the offset used in the computer to move the first region so that the first region corresponds to a different subset of the information from the first input relating to the field of view, the computer generating the display images based on the processing activity applied to the information to which the first region corresponds; and an output to the display unit for providing the display images to the display unit;

wherein the computer does not apply the processing activity applied to the first region to the second region.

2. The head-up display of claim 1, wherein the computer comprises a HUD computer.

3. The head-up display of claim 1, wherein the imaging sensor comprises an infrared (IR) imaging sensor.

4. The head-up display of claim 1, wherein the imaging sensor is fixed relative to the aircraft.

5. The head-up display of claim 1, wherein the imaging sensor and computer communicate over an ARINC 429 bus.

6. The head-up display of claim 1, wherein the source provides aircraft sensor information.

7. The head-up display of claim 1, wherein the source provides inertial reference data.

8. The head-up display of claim 1, wherein the source provides global positioning system (GPS) information.

9. A method of providing a processed imaging sensor image on a head-up display (HUD) system for an aircraft, the method comprising:

receiving, by a computer, aircraft sensor information comprising information representative of the flight path of the aircraft;

receiving, by the computer, imaging sensor image information from an aircraft mounted imaging sensor, the imaging sensor having a pointing direction and a field of view, the computer defining a region of special processing within and smaller than the field of view and corresponding to a subset of the image information, wherein a second region defines a remainder of the field of view and corresponding to a remainder of the image information;

generating an offset for the region of special processing by a program running on the computer, the offset being based on the flight path of the aircraft and the imaging sensor pointing direction;

using the offset to cause the region of special processing to be moved within the field of view so that the region of special processing corresponds to a different subset of the image information; and conducting a processing activity on the imaging sensor information of the moved region of special processing and displaying the processed region corresponding to the different subset of the image information, wherein the processing activity applied to the region of special processing is not applied to the second region.

10. The method of claim 9, further comprising:
determining by the computer a wind vector.

11. The method of claim 9, further comprising:
determining by the computer a velocity vector.

12. The method of claim 9, wherein the imaging sensor is fixed relative to the aircraft.

13. The method of claim 9, wherein the imaging sensor comprises an infrared (IR) imaging sensor.

14. The method of claim 9, wherein sensor information comprises inertial reference data.

15. The method of claim 9, wherein sensor information comprises global positioning system (GPS) information.

16. A head-up display (HUD) system for an aircraft, comprising:

a means for receiving aircraft sensor information comprising information representative of the flight path of the aircraft;

a means for receiving imaging sensor image information from an aircraft mounted imaging sensor, the imaging sensor having a pointing direction and a field of view;

a means for generating an offset for a region of special processing by a program running on a computer, the computer defining the region of special processing within the field of view and corresponding to a subset of the image information and a second region defining a remainder of the field of view and corresponding to a remainder of the image information, the offset being based on the flight path of the aircraft and the imaging sensor pointing direction;

a means for using the offset to cause the region of special processing to be moved within the field of view so that the region of special processing corresponds to a different subset of the image information; wherein the means for generating conducts a processing activity on the imaging sensor information of the moved region corresponding to the different subset of the image information and generates an image for display based on the processing, wherein the second region is not processed using the same processing activity applied to the region of special processing.

17. The system of claim 16, further comprising:
a means for determining by the computer a wind vector.

18. The system of claim 16, further comprising:
a means for determining by the computer a velocity vector.

19. The system of claim 16, wherein the imaging sensor is fixed relative to the aircraft.

20. The system of claim 16, wherein the imaging sensor comprises an infrared (IR) imaging sensor.

21. The system of claim 16, wherein sensor information comprises inertial reference data.

22. The system of claim 16, wherein sensor information comprises global positioning system (GPS) information.

23. The system of claim 16, wherein the imaging sensor comprises a millimeter wave radar.

24. A display system for an aircraft, comprising:
a computer receiving information representative of an aircraft flight path;
a display unit, displaying information to a flight crew member;
an imaging sensor coupled to the computer, the imaging sensor having a pointing direction and a field of view;
a region of special processing defined within the imaging sensor field of view and corresponding to a subset of the image information, a second region defined by the remainder of the imaging sensor field of view and corresponding to a remainder of the image information; and a program running on the computer, the program determining an offset for the region of special processing, the offset based on the aircraft flight path and the imaging sensor pointing direction, the offset used in the computer to cause the region of special processing to be moved so that the region of special processing corresponds to a different subset of the image information based on the direction of the aircraft flight path, the computer conducting a processing activity on the imaging sensor information of the moved region of special processing corresponding to the different subset of the image information to generate an image for display on the display unit;

wherein the second region is not subjected to the same processing activity as the region of special processing.

25. The display system of claim 24, wherein the display unit is a head-down display.

* * * * *